J. A. McANULTY & J. REANEY, Jr.
BAG FILLING AND WEIGHING MACHINE.
APPLICATION FILED JUNE 24, 1910.

992,513.

Patented May 16, 1911.

Witnesses
Edwin L. Bradford
G. Ferdinand Vogt

Inventors
John A. McAnulty
James Reaney Jr
By Maurr Vro.
Attorneys

J. A. McANULTY & J. REANEY, Jr.
BAG FILLING AND WEIGHING MACHINE.
APPLICATION FILED JUNE 24, 1910.

992,513.

Patented May 16, 1911.

J. A. McANULTY & J. REANEY, Jr.
BAG FILLING AND WEIGHING MACHINE.
APPLICATION FILED JUNE 24, 1910.

992,513.

Patented May 16, 1911.

Witnesses
Edwin L. Bradford
G. Ferdinand Vogt.

Inventors
John A. McAnulty
James Reaney Jr
By Marie T. Leo
Attorneys

J. A. McANULTY & J. REANEY, Jr.
BAG FILLING AND WEIGHING MACHINE.
APPLICATION FILED JUNE 24, 1910.

992,513.

Patented May 16, 1911.

Witnesses
Edwin L. Bradford
G. Ferdinand Vogt

Inventors
John A. McAnulty
James Reaney Jr
By Munn & Co
Attorneys

UNITED STATES PATENT OFFICE.

JOHN A. McANULTY, OF BALTIMORE, AND JAMES REANEY, JR., OF SHERWOOD, MARYLAND, ASSIGNORS TO SAID JAMES REANEY, JR., OF SHERWOOD, MARYLAND.

BAG FILLING AND WEIGHING MACHINE.

992,513.          Specification of Letters Patent.      Patented May 16, 1911.

Application filed June 24, 1910. Serial No. 568,657.

*To all whom it may concern:*

Be it known that we, JOHN A. McANULTY and JAMES REANEY, Jr., citizens of the United States, the former residing in the city of Baltimore and State of Maryland, and the latter residing at Sherwood, in the county of Baltimore and State of Maryland, have invented certain new and useful Improvements in Bag Filling and Weighing Machines, of which the following is a specification.

This invention relates to improvements in bagging machines and has reference to a machine for feeding and discharging materials in predetermined quantities into receptacles.

One object of the invention is to provide an improved machine which will operate to simultaneously fill a plurality of bags and which will permit filled bags to be removed and empty bags to be attached for filling in rapid succession.

Another object of the invention is to provide a construction of machine by means of which materials may be fed until a predetermined quantity or weight has been placed in the bags.

A further object is to provide an improved construction of machine whereby when a bag has been filled to a predetermined amount the feeding of the material will be discontinued.

Another object is to provide a rotary machine having a plurality of filling and weighing mechanisms moving through a circuit whereby empty bags may be attached at one point in the circuit and conveyed during the filling and weighing operation and then discharged.
A further object is to provide an improved construction of rotary machine whereby in case the predetermined amount or quantity of material has not been deposited in a bag at the time the bag reaches a given point in the circuit of the machine rotation of the latter will be stopped until the required quantity has been deposited in the bag.

Another object is to provide a machine of improved construction, combination and arrangement of the various parts whereby to effect the automatic filling and weighing of materials into bags and to discharge the filled bags from the machine.

With these and other objects in view, the invention is illustrated in the accompanying drawings in which,—

Fig. 20 is an enlarged section through the upper end of the tubular support and upper bearing for the central vertical shaft,
and Fig. 21, is a top plan view of the upper center bearing.

Figure 5:
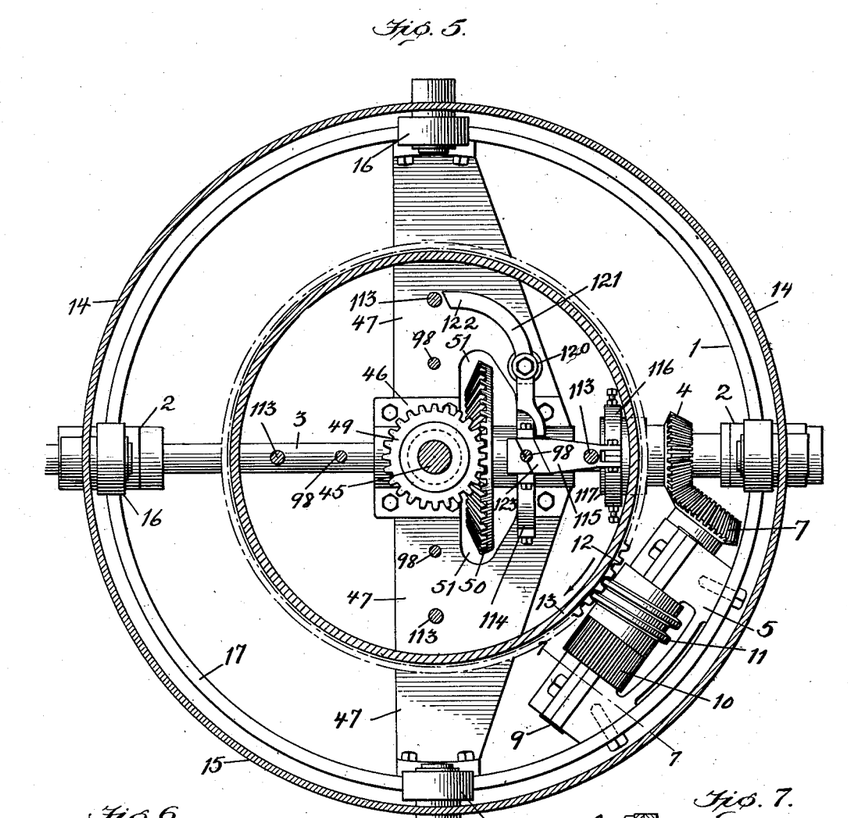
Fig. 5, a similar view through the lower portion of the machine,— this section being taken on the line 5—5 of Fig. 3.
Figure 6:
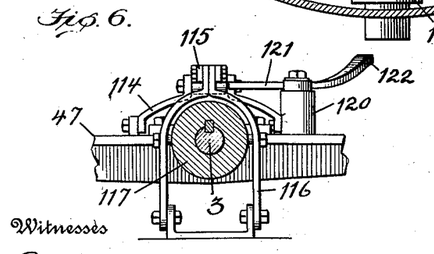
Fig. 6, is a vertical sectional detail of the clutch mechanism for automatically stopping the machine under certain conditions,—the section being taken on the line 6—6 of Fig. 3.
Figure 7:
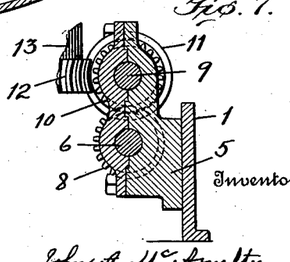
Fig. 7, is a sectional detail through the worm shaft and the driving means for operating the same to effect a revolution of the carrier above the same,— this section being taken on the line 7—7 of Fig. 5.
Figure 8:
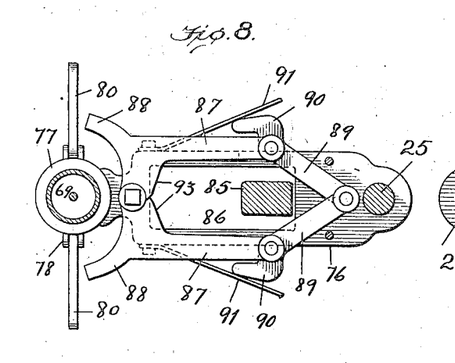
Fig. 8, is an enlarged sectional plan view through the filling tube and the means for operating the receptacle or bag-holding devices about the tube,—the section being taken on the line 8—8 of Fig. 2.
Figure 9:
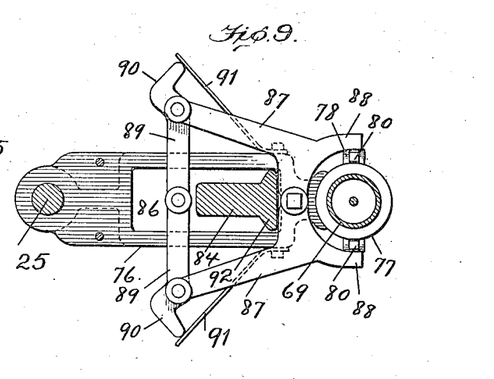
Fig. 9, is a similar view but shows the said devices in the operated position and also shows a portion of the counter-balancing means for sustaining said devices,—this section being taken on the line 9—9 of Fig. 2.

Referring to the drawing by numerals, 1, designates a circular hollow base having bearings, 2, in diametrically opposite sides which sustain a horizontal driving shaft, 3, having a beveled pinion, 4, thereon adjacent one end thereof. A horizontal bracket bearing, 5, (see Figs. 5 and 7) is secured against the vertical wall of the base and sustains a lower short horizontal shaft, 6, one end of which carries a bevel gear, 7, that meshes with and is driven by the pinion, 4, on the main shaft and the opposite end of which carries a pinion, 8. The bracket bearing, 5, also sustains an upper horizontal shaft, 9, which mounts a gear, 10, that is driven by pinion, 8, directly beneath it, and which also has a worm, 11, thereon that engages a rack, 12, on a circular ring-plate, 13, that depends from the bottom of a table or carrier, 14. This table or carrier, 14, extends horizontally over the hollow base, 1, and has a circular depending circumferential flange, 15, which carries a plurality of rollers, 16, that travel on the upper rim edge, 17, of the base which serves as a track for the carrier or table. It will thus be understood that the table or carrier is revolved by the worm, 11, and rack, 12, and that it is sustained on the rim-edge of the base by the rollers, 16.

Figures 14, 15, 16, 17, 18, 19:
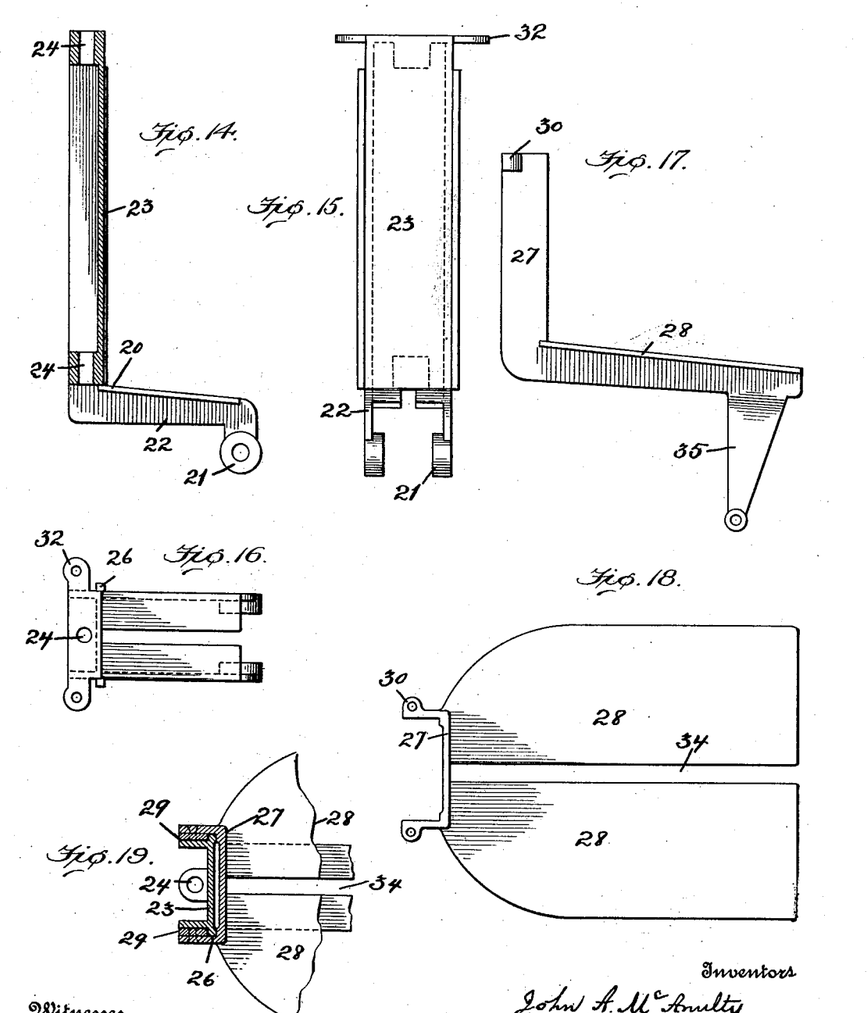
Figs. 14, 15 and 16 are sectional, front elevation and plan views respectively of the scale platform supports.
Figs. 17 and 18 are side elevation and plan views respectively of the detached scale platforms.
Fig. 19 is a sectional plan view through the upright portions of a support and a platform.

The table or carrier, 14, is provided with a plurality of brackets, 18, which project above its upper surface and sustain scale beams, 19, the outer ends of which pivotally carry platform supports, 20. These supports, see Figs. 14, 15 and 16 of the drawings, have circular bearings or eyes, 21, which straddle the outer ends of and are pivotally connected to the scale beams and are also provided with horizontal and vertical portions, 22, and, 23, respectively. The vertical portions, 23, of the supports have vertically extending perforations, 24, through which a rod, 25, extends which latter serves as a vertical guide for a filling nozzle mechanism as will presently appear. Vertical lugs or flanges, 26, are provided at opposite edges of the vertical portion of the support which flanges project slightly to the sides and serve as guides for the upright channel portion, 27, of scale platforms, 28, as clearly seen in Figs. 17, 18 and 19 of the drawings. Plates, 29, are attached to the inner sides of the channel portion, 27, of the scale platform and extend vertically at the rear of the flanges, 26, whereby to prevent lateral separation of the platform from the vertical portion, 23, of the support but which permit the platform to be moved vertically for adjustment with respect to said support.

The upper end of the channel portion, 27, of the platform is provided with perforated side lugs, 30, which perforations are internally threaded so as to receive and engage the lower ends of vertical adjusting screws, 31. These screws extend vertically above the lugs, 30, and their upper ends pass freely through side lugs, 32, on the vertical portion, 23, of the supports, 20, and at the upper side of said latter lugs, 32, the screws carry small wheels, 33, by means of which they may be conveniently rotated. As the screws cannot move vertically because they are suspended from the upper lugs, 32, their rotation will cause the platforms, 28, to move vertically on the vertical portion, 23, of the supports from which portion they are suspended. By means of this adjustment the platforms may be raised or lowered with respect to the filling nozzles presently to be described, to accommodate bags of different lengths.

By reference to Figs. 1, 3, 4 and 17, it will be seen that the scale platforms are provided with slots, 34, forming central vertical slots therein, and that at each side of the slot each platform is provided with downwardly-extending brackets, 35, the lower ends of which are slightly separated. A bell-crank lever, 36, is pivotally sustained between the lower ends of the platform brackets, 35, and the lower arm of said lever carries a roller, 37, while the upper arm thereof pivotally connects a bar, 38, which extends upwardly in a slightly inclined direction and passes from the slot, 34, from the under to the upper side of the platform. This bar, 38, carries a curved bag-ejector plate, 39, which extends or projects vertically above the platform, 28, and has position between the upright channel portion, 27, and the bag that is undergoing the filling operation. When the bag has been filled and has been conveyed to the point of ejection, the roller, 37, on bell-crank lever will contact with a suitable stationary cam or track, 40, and the bell crank thereby swung down and outwardly so as to draw the ejector plate, 39, outward over the platform and thus push the filled bag from said platform.

A column or tubular support, 41, has its lower end seated upon the upper surface of the table or carrier, 14, and has a slightly reduced upper end which is embraced by a collar, 42, which carries upwardly-projecting bracket arms, 43, (see Fig. 20) that sustain a central upper bearing, 44. This bearing receives the upper end of a shaft, 45, that extends vertically through the column and which has its lower ends seated in a step bearing, 46, that rests upon a stationary support, 47, that extends horizontally and diametrically across the interior of the circular base, 1, as clearly seen in Fig. 5. The lower end of this shaft, 45, is also embraced by a sleeve, 48, that extends slightly into the lower end of the column, 41, and which is carried on the ring-plate, shown in Fig. 3. Between the sleeve, 48, and the step bearing, 46, the shaft, 45, carries a bevel pinion, 49, which meshes with and is driven by a bevel gear, 50, on the main or driving shaft, 3,—a slot or opening, 51, being provided in the stationary support, 47, through which the bevel gear projects.

It will be seen that the vertical shaft, 45, is revolved continuously in the column as long as the driving shaft, 3, is revolved and also that the table, 14; column, 41; scale platforms and bag ejectors are also made to travel in a circular direction with respect to the base, 1. It will further be seen that the bearing, 44, at the upper end of the column also revolves with the column.

Figures 2, 20, 21:
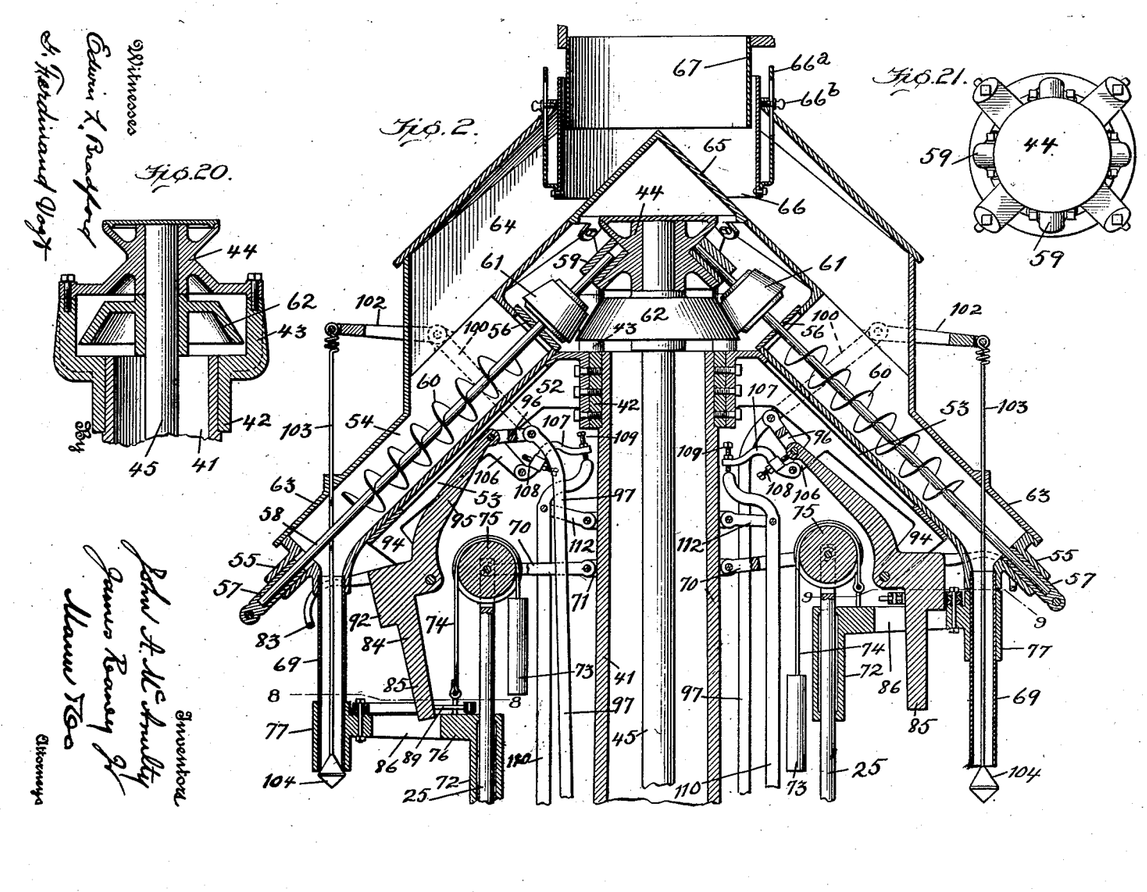

The collar, 42, at the upper end of the column carries a plurality of brackets, 52, having downwardly-inclined extensions, 53, which form supports for conveyer trunks, 54. In the present instance these trunks, of which there are four in number, have an inclined position with a tubular extension, 55, at the lower end and a bearing plate, 56, at the upper end. A plunger-like stem, 57, snugly fits the tubular extension, 55, and has a central socket which receives the lower end of a shaft, 58, while the upper end of said shaft passes through the bearing plate, 56, and enters an inclined socket, 59, in the central upper bearing, 44, as seen in Fig. 2, of the drawings. The shaft, 58, is provided with a screw or conveyer, 60, which revolves in the trunk, 54, and the upper end of said shaft carries a beveled friction pulley, 61, which contacts with and is driven by a large friction wheel, 62, on the upper end of the vertical shaft, 45.

Casings or covers, 63, are seated on the upper sides of the conveyer trunks, 54, and carry a housing, 64, that completely incloses the upper end of the machine and said housing adjustably sustains a circular shell, 66, by means of vertically-slotted bars, 66ª, and wing bolts, 66ᵇ. The shell, 66, depends centrally over the cap plate and receives the lower end of a chute, 67, through which the material to be weighed and bagged is fed to the interior of the housing. A conical cap plate, 65, covers the upper bearing, 44, and projects up into the shell, leaving an annular passage through which the materials pass.

It will be understood that the covers, 63, housing, 64, cap-plate, 65, and circular shell, 66, all revolve with the tubular support, 41, from which they are indirectly sustained but that the chute, 67, that depends from a suitable conveyer, 68, over the machine does not revolve, but merely directs the materials into the housing wherein it will be distributed by the conical cap plate into the several conveyer trunks.

The lower end of each conveyer trunk carries a depending tube, 69, which forms a discharge nozzle for the escape of the material into the bag which will presently be explained.

The rod, 25, which extends vertically adjacent to the bag support, 20, is connected at its upper end to the outer end of a pivoted bracket, 70, the inner end of which latter is pivotally sustained by suitable lugs, 71, that project from the tubular support, 41. The lower end of the rod, 25, is rigid with the support and the platform, 28, so that when the latter settles because of the weight of the material in the bag the rod will move downwardly therewith and when the weight is removed the platform and rod will move upwardly. This downward movement of the platform and rod is utilized to effect a closure of the lower end of the filling tubes as the weighted bag operates the scale platforms and also operates the mechanism that releases the filled bag from the end of the filling tube, as will now be described, reference being made particularly to Figs. 1, 2, 8, 9, 10 and 11 of the drawings.

Figure 1:
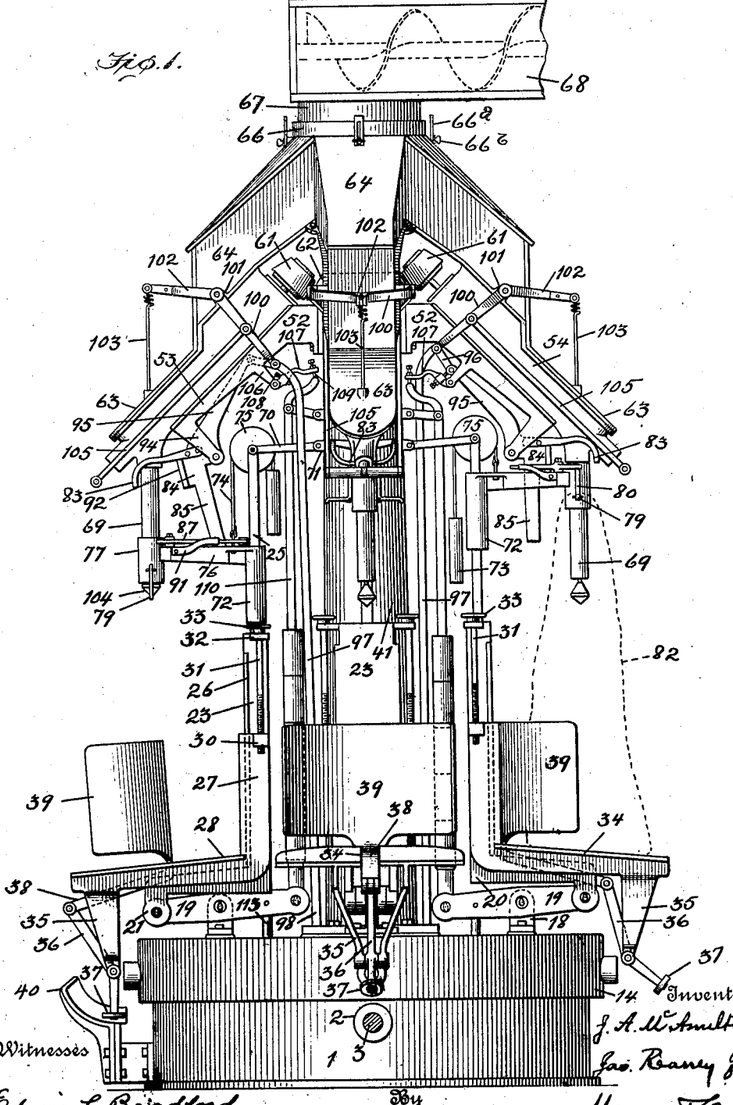
Figure 1, shows a side elevation of the complete machine, Fig. 2, an enlarged sectional elevation of the upper part of the same, Fig. 3, an enlarged sectional elevation of the lower part thereof.
Figures 10, 11, 12, 13:
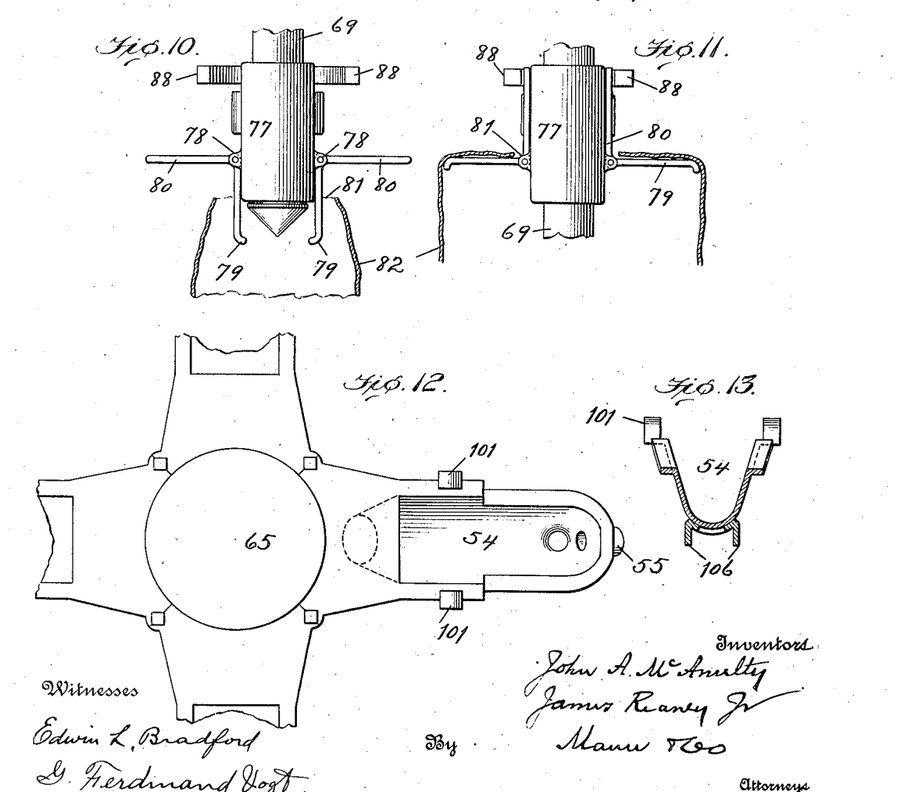
Figs. 10 and 11 show two views of the bag-engaging arm in the collapsed and spread positions respectively.
Fig. 12, is a plan view of the conveyer trunks.
Fig. 13, is a vertical section through one of the conveyer trunks.

By reference to Figs. 1 and 2, it will be noted that a tubular support, 72, is carried on the vertical rod, 25. This support is sustained by a counter-balance weight, 73, that depends from a band, 74, which passes around a roller, 75, at the upper end of the rod,—the weight being sufficient to balance the support and the device carried thereby. A bracket, 76, extends horizontally from the support and carries a head or sleeve 77, at its outer end which encircles the discharge nozzle, 69, and is movable vertically thereon. This head or sleeve is provided at diametrically opposite sides with lugs, 78, which pivotally sustain bag-engaging arms, 79, each having a lever-end, 80, that is rigid therewith and which extends at right angles thereto as seen clearly in Figs. 10 and 11. The bag-engaging arms, 79, normally, and during the absence of a bag, extend downwardly from the lugs, 78, while the lever-ends, 80, thereof at that time project horizontally. These positions of the arms and lever-ends enable the mouth opening, 81, of the bag, 82, to be readily passed upwardly around the lower end of the nozzle and head or sleeve and while doing this the hands of the operator may be directed against the under side of the lever ends and turn said ends upwardly against the head and by such movement throw the arms, 79, horizontally, as shown in Fig. 11, so they will project laterally at the inner side of the filling opening of the bag and sustain the latter. The operator then raises the head or sleeve, 77, by sliding the same on the tube, 69, which also elevates bracket, 76, and head, 72, all of which are counter-balanced by weight, 73. When the head or sleeve is raised on the filling tube to the position shown at the right hand side of Figs. 1 and 2 an arm, 83, that projects outwardly from a lever, 84, will also be raised and the said lever will be swung so that its lower end, 85, will assume a substantially vertical position.

By reference to said Figs. 1, 2, 8 and 9 it will be seen that the bracket, 76, is provided with a central vertical opening or slot, 86, through which the lower end, 85, of the lever, 84, projects and in which said lever-end may swing. It will also be seen by reference to Figs. 8 and 9 that the upper horizontal surface of the bracket, 76, carries two clamping levers, 87, which are pivoted thereon at the rear of the head or sleeve, 77. These clamping levers, 87, are provided with jaws, 88, at their outer ends which project forward and at opposite sides of the head or sleeve, 77, and are so positioned that they may be moved toward said head and by engaging the lever-ends, 80, of the bag-holder keep said ends pressed against the head and hold the arms, 79, horizontally during the filling operation. The inner ends of the clamping levers, 87, carry toggle levers, 89, which latter, at the point where they pivotally connect the clamping levers, are provided with outwardly-projecting latch lugs, 90, which are rigid therewith, and against which flat leaf springs, 91, press to normally keep the toggle broken and the jaws, 88, projected outwardly away from the head. When however, the head, 77, and bracket, 76, are raised, and the lever, 84, is swung outwardly by raising arm, 83, the broad flat head, 92, of lever, 84, will move outwardly through the slot, 86, of the bracket and will contact with the central pivoted portions, 93, of the clamping levers at the rear of the pivot and cause the jaws, 88, to move toward the head, 77, and hold the lever-ends, 80, in the vertical position, thus retaining the filling end of the bag around the nozzle or filling tube.

The lever, 84, is pivoted to an arm, 94, that projects at the under side of the bracket extensions, 53, below the conveyer trunks and said lever has an arm, 95, at its upper end which is pivotally connected by a link, 96, to the upper end of a vertical rod, 97, which extends all the way from the said link down at the side of the central tubular support, 41, and has its lower end, 98, projecting through perforations, 99, in the base of the support; the carriage, 14, and ring-plate, 13, as clearly seen in Fig. 3, for a purpose presently to be explained. The upper end of the vertical rod, 97, is also pivotally connected to a yoke, 100, that encircles the conveyer trunk, 54, and which is pivotally sustained by lugs, 101, at the upper side of the casing or cover, 63, over the conveyer trunk. This yoke has an arm, 102, that projects centrally over the cover, 63, and which carries a depending rod, 103, that extends down through the cover and also through the filling tube, 69, and has a cone-plug, 104, at its lower end to effect a closure of the discharge end of the filling tube.

By reference to Fig. 1 it will be seen that the yoke, 100, carries a bar, 105, at each side of the conveyer trunk and that said bars extend downwardly in an inclined position and are connected at their lower ends with the plunger stem, 57, in which the lower end of conveyer-shaft, 58, has bearing. This construction causes the plunger-stem to be lowered simultaneously with the raising of yoke arm, 102, and the lowering of rod, 97, which movements occur when the predetermined weight has been supplied in the bag, as presently to be explained, and the said downward movement of the plunger stem permits the conveyer shaft, 58, to move downwardly a sufficient distance to disengage the friction pulley, 61, from the wheel, 62, thereby causing the shaft, to discontinue its revolution and consequently the material in the conveyer trunk will no longer be forced by the screw, 60, toward the lower end. Thus it will be understood that when a predetermined weight of material has been discharged into the bag the filling nozzle will be closed and the feed screw will stop revolving. To effect this cutting-off operation automatically it will be noted that a hanger bracket, 106, is provided on the bottom of the conveyer-trunk and that an arm, 107, is pivoted thereto. This arm is provided with screw-stops, 108, and, 109, respectively,—the latter having position directly over the upper end of a weight rod, 110, which extends vertically at the side of the tubular support, 41, and whose lower end is pivotally connected with the scale beams, 19, above the table or carrier. This rod carries the weights, 111, and its upper end is sustained loosely by means of a link, 112, that is pivoted to the side of the tubular support.

When the lever, 84, and in fact all the filling mechanism is in the position to fill, the screw stop, 108, on pivoted arm, 107, has position at the joint of the link, 96, and arm, 95, of the lever, 84, as seen at the right hand side of Fig. 2 of the drawing so that when weight rod, 110, is elevated by the filled bag, its upper end will raise arm, 107, and move stop, 108, outwardly and thereby move the link, 96, and arm, 95, outwardly sufficiently to cause the lower end, 85, of lever, 84, to swing rearwardly in the slot of the bracket, 76, and by such movement contact with the toggle levers, 89, and break their locking joint so that the springs, 91, can operate the clamping jaws, 88, to release lever-ends, 80, and free the filled bag from the nozzle or filling tube.

As the filling of the bag progresses it will gradually draw down the head or sleeve, 77, so that when completely filled the head will have position at the lower end of the filling tube.

During the operation of the machine it may sometimes occur that a bag is unfilled or not completely filled immediately before it reaches the point of discharge, and we have therefore provided means whereby the rotation of the machine may be stopped long enough to permit the bag to be filled before discharging it. This is effected by means of devices which will now be described, reference being made particularly to Figs. 2, 3, 5 and 6.

Figure 3:
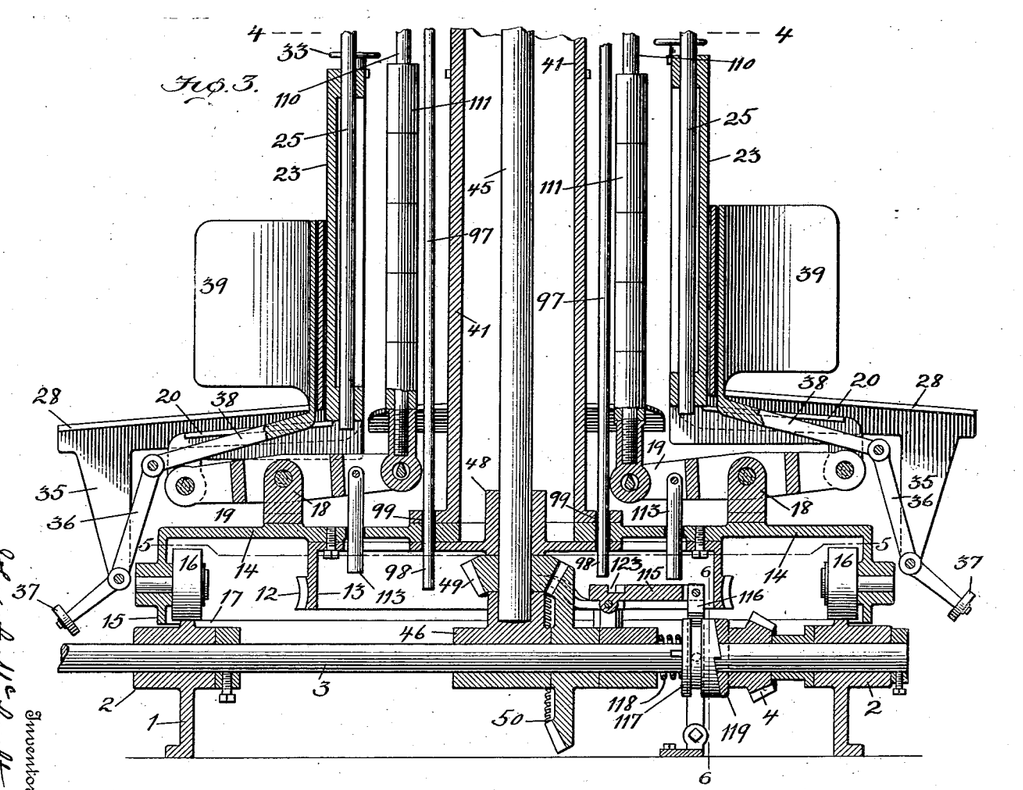
Figure 4:
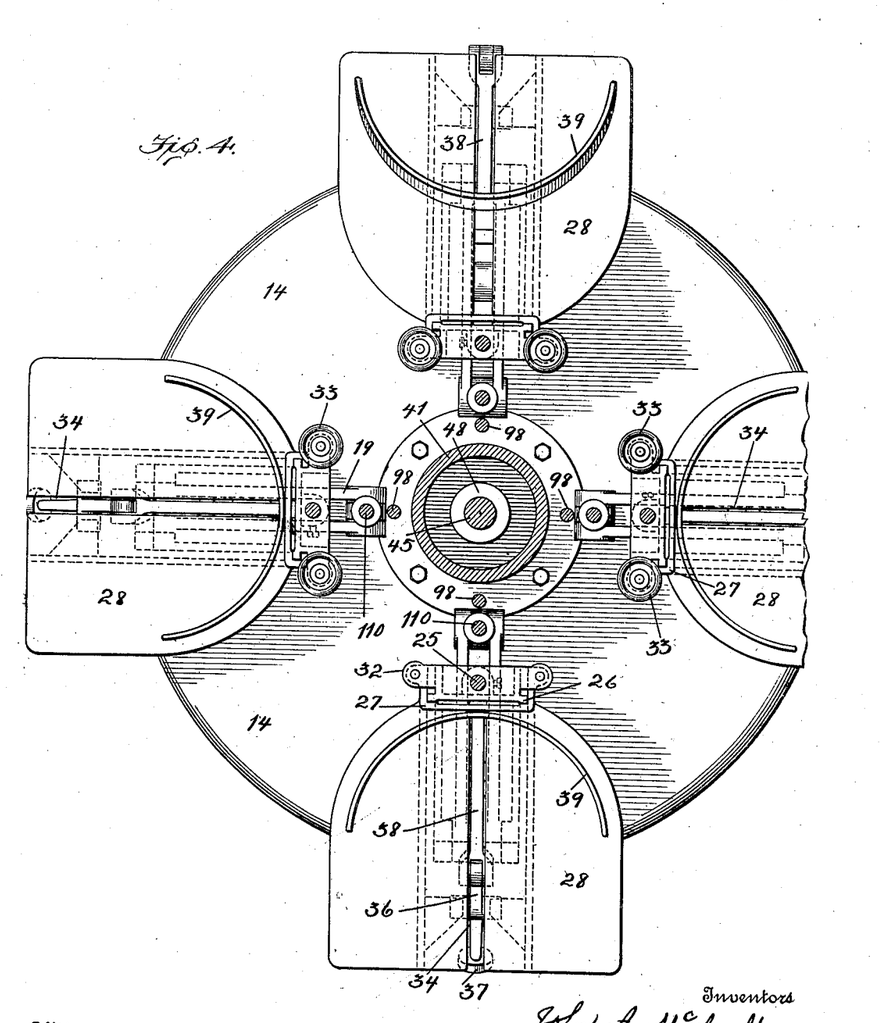
Fig. 4, is a sectional plan view through the machine on the line 4—4 of Fig. 3.

It is to be understood that during the filling of the bag, see right hand side of Figs. 2 and 3, the inner end of the scale beam, 19, will be depressed and said end of the scale beam is provided with a depending post, 113, which rises and falls with the scale beam and which also travels in a circuit as the table revolves.

The horizontal support, 47, in the circular base pivotally sustains an arched or curved bracket, 114, the upper part of which pivotally connects with the rear end of a horizontal clutch plate, 115, so that the clutch plate and the curved bracket may swing together. The outer end of this clutch plate is connected to the upper end of a yoke, 116, the lower end of which is pivotally secured at the bottom to the base and which extends through and engages a circular groove in a clutch member, 117, that revolves with the main driving shaft, 3. This grooved clutch member is mounted on the main shaft by a connection, such as a spline, so as to permit it to be moved longitudinally on the shaft,—a spring, 118, at the inner side of the clutch member, 117, serves to normally press said member outwardly on the shaft and into engagement with another clutch member, 119, that is maintained loosely on the shaft and which has no longitudinal movement thereon. By referring to Figs. 5 and 6, it will be seen that a short vertical support, 120, is carried on the upper side of the horizontal support, 47, and that a horizontal lever, 121, is pivotally sustained between its ends by said support. One end of this lever projects at the outer side of the pivoted bracket, 114, while the other end thereof, 122, curves backwardly so as to lie in the path of the lower end of any post, 113, that is in the depressed position as it approaches said lever end, 122. If a post, 113, is depressed, which it will be if the weight in the bag is insufficient to raise the inner end of the scale beam, 19, said depressed post will contact with the end, 122, of said lever and swing said lever end in the direction in which the post is traveling. Consequently the other end of the lever will be moved in the opposite direction and throw the pivoted bracket, 114, and clutch plate toward the large gear, 50, and thereby move the clutch member, 117, against the action of the spring, 118, and out of engagement with the clutch member, 119. This operation will permit the clutch member, 119, to cease revolving and consequently pinion, 4, and gears, 7, 8, and, 10, will become idle and the table, 14, will come to rest, and while the filling of the bags will continue they will not advance. This condition will remain until the foremost bag will become heavy enough to raise scale beam, 19, whereupon post, 113, will rise above lever end, 122, and the spring, 118, will then move all the affected parts to their normal operative position to cause the clutch members to again engage and rotate the table.

If for any reason the operator fails to attach an empty bag to a filling tube immediately upon the removal of a filled bag we have also provided means for stopping the machine until an empty bag has been attached. This is also effected partly through the clutch plate, 115, which latter is provided with a diagonal cross-groove, 123, in its upper surface. The position of this groove is such that one end thereof is closer to the inner end of the clutch-plate than the other end of said groove. The inner end of this diagonal groove (see Fig. 5) is normally in the direct circular path of the lower ends, 98, of the rods, 97, which rods are depressed when heads or sleeves, 77, on the filling tubes are lowered, consequently if a bag is absent, as it is when the head or sleeve, 77, is in the lowered position, the end, 98, of rod, 97, will be depressed where it will enter one end of the diagonal groove, 123, and as the rod cannot move laterally it will force the clutch plate, 115, inwardly as it passes through the groove and this movement of the clutch plate will operate the clutch member, 117, to stop the machine until the rod, 97, is elevated by the attachment of a bag and the elevation of the head, 77, and forward movement of lever, 84.

In the operation of the machine the table, scale platforms and filling conveyer trunks all turn together. The operator will place his hands in the open ends of a bag and draw it up around the nozzle, 69, and also around the lower end of the movable head, 77, and depending bag-engaging arms, 79, thereon. In doing this the hands will be brought against the under side of the lever ends, 80, which at that time extend horizontally and said ends will be turned upwardly and against the circumference of the head, 77, thereby throwing the arms, 79, outwardly to engage the bag, as seen in Figs. 10 and 11. The operator then raises the head, 77, on the tube, 69, which also elevates bracket, 76, and head, 72, and clamping jaws, 88, will engage lever-ends, 80, and hold the bag-engaging arms, 79, in the operated position and the bag open to receive the material from the nozzle. Simultaneously with the elevation of the head, 77, to effect a clamping of the bag the arm, 83, will be elevated and the upper end, 95, of lever, 84, will actuate link, 96, so as to swing the yoke, 100, which will do two things,—1st, lower rod, 103, and move cone-plug, 104, from the lower end of nozzle, 69, thus allowing the material to discharge into the bag and, second, draw bars, 105, upwardly to impart a like movement to conveyer shaft, 58, and thereby engage friction pulley, 61, with wheels, 62, and feed the material through the trunk to the nozzle, 69, and discharge it into the bag. This condition prevails until the bag has received the required weight of material.

It will be understood that while the bag is being filled its lower end rests upon a scale platform, 28, which is sustained by a scale beam, 19, and a weighted rod, 110. When therefore the weight in the bag is sufficient to actuate the beam, 19, the rod, 110, and weights, 111, thereon will be elevated,— the upper end of said rod, 110, will raise carrying arm, 107, with it. The stop, 108, will thus press link, 96, and lever end, 95, outwardly which will rock yoke, 100, and raise rod, 103, to close the discharge nozzle by drawing cone plug, 104, up against the lower end thereof. At this same time the lower end, 85, of lever, 84, will swing rearwardly in the slot of bracket, 76, and will break the toggle joint and allow springs, 91, to move the clamping jaws, 88, and thus release the lever ends, 80, to free the open end of the filled bag.

When the filled bag has been released from about the filling nozzle and is conveyed around to the point where it is to be discharged the roller, 37, will contact with cam or track, 40, which will swing the upper end of lever, 36, outwardly and also move the bar, 38, and ejector plate, 39, in the same direction, as shown at the left-hand side of Fig. 1, and thus push the filled bag off, where it will be received on a suitable conveyer to carry it off.

If for any reason a bag remains unfilled when it reaches the point of discharge we have provided means for stopping the rotation of the machine until the bag receives the desired quantity of material. This is effected by means of the depending post, 113, at the inner end of the scale beam, 19, which post, when the weight of the bag is insufficient to raise the inner end of the scale beam will depend further than when the said end of the scale beam is raised because the post rises and falls with the scale beam. When therefore, the bag approaches the point of discharge and is insufficiently filled the post, 113, and inner end of scale beam, 19, will both be in a depressed position and the lower end of the post will contact with the end, 122, of lever, 121, and swing the lever in a horizontal plane which will operate to release the clutch members, 117, and 119, thus stopping the revolution of the machine but allowing the feeding of the material into the bag to continue. When the bag receives the desired quantity of material the scale beam will rock and draw the post, 113, upwardly thus releasing lever, 121, and spring, 118, will force the clutch members, 117, and 119, into engagement to again impart a rotary motion to the table and scale platforms.

In the operation of the machine provision is also made for stopping the revolution of the machine in case the operator fails to attach an empty bag to a filling tube upon removing a filled bag. When a filled bag is removed from the head, 77, the latter is in a depressed position and the position of lever, 84, is such that its upper end, 95, which is connected by link, 96, with the upper end of vertical rod, 97, that said rod will be depressed. The lower end, 98, of this rod when depressed is utilized to stop the rotation of the machine by engaging the clutch plate, 115. As already explained this clutch plate has a diagonal cross-groove, 123, in its upper surface which is so arranged that when a depressed end, 98, of a rod, 97, enters said groove it will cause the clutch plate, 115, to be moved horizontally toward the gear, 50, and thus actuate the clutch member, 117, to withdraw it from member, 119, thereby stopping further rotation until a bag has been placed on the empty holder and the rod, 97, raised so its lower end, 98, will be withdrawn from the groove, 123.

It will thus be understood that if a bag is not placed on a filling tube to be filled, or if a bag is not sufficiently filled when it reaches the point for its discharge the machine will be stopped until either of these things are corrected.

Having thus described our invention what we claim and desire to secure by Letters Patent is,—

1. In a bag-filling machine the combination with a filling tube, of means for closing said tube; bag-engaging means movable longitudinally on the tube; a scale beam; a movable support for the lower end of the bag and carried by the scale beam and a connection between the scale beam, the tube-closing means and the bag-engaging means whereby to release the bag as the tube is closed.

2. In a bag-filling machine the combination with a filling tube, of means for feeding material to said tube; bag-engaging means movable on the tube; a movable support below the filling tube; means operated by the movable support to stop the feeding means, and means for releasing the bag as the feeding means is stopped.

3. In a bag-filling machine the combination with a filling tube, of means for feeding material to said tube; a head movable on said tube; bag-clamping means carried by the head; lever mechanism movable between the feeding means and the bag-clamping means; a bag-support below the filling tube and rods movable between the said lever mechanism and the bag-support whereby to stop the feeding means and release the bag-clamping means.

4. In a bag-filling machine the combination with a rotary carrier, of a plurality of bag-supports on the carrier and movable therewith and also independently thereof; filling tubes sustained above the supports and also moving with the carrier; bag-engaging means on each filling tube and means operating between a bag support and an engaging means above the same for releasing the bag.

5. In a bag-filling machine the combination with a rotary carrier, of a plurality of scale platforms sustained by and moving with the carrier; a filling tube over each platform and also moving with the carrier; means movable on each tube for engaging a bag and means operating between each platform and one of the bag-engaging means to release a bag.

6. In a bag-filling machine the combination with a rotary carrier, of a plurality of scale platforms sustained by and moving with the carrier; a plurality of conveyer trunks over the carrier and traveling therewith; a filling tube carried by each trunk; bag-engaging means on each tube; means for closing the tubes, and lever mechanism operated by the scale platforms to operate the closing means and to also operate the bag-engaging means to release a bag.

7. In a bag-filling machine the combination with a rotary carrier, of a plurality of scale platforms moving with the carrier; a plurality of conveyer trunks over the carrier and traveling therewith; feeding means in each trunk; a filling tube for each trunk; bag-engaging means on each tube and lever mechanism operating between the scale platforms and the feeding means in the trunks whereby to stop said feeding means by the movement of the platforms.

8. In a bag-filling machine the combination with a carrier, of a plurality of filling tubes; bag-engaging means for each tube; means for rotating the carrier while the bags are being filled; means for weighing the material in the bags and means for stopping the rotation of the carrier when the bag is insufficiently filled at the time the carrier reaches a given point in its rotation.

9. In a bag-filling machine the combination with a carrier, of a plurality of filling tubes; bag-engaging means for each tube; means for rotating the carrier while the bags are being filled; a scale platform beneath each tube; means for stopping the discharge of material into the bag when the scale platform is operated by the weight of the material in the bag and means for stopping the rotation of the carrier when the bag approaches the point of discharge with an insufficient weight therein to operate the scale platform.

10. In a bag-filling machine the combination with a carrier, of a plurality of scale platforms carried by and moving with the carrier; means for rotating the carrier; a conveyer trunk over each scale platform and moving in a circular path therewith; a filling tube for each trunk; a conveyer in each trunk for feeding material toward the filling tube; means for closing the tubes; means for operating the conveyers and means operating between the scale platforms and the tube closing and conveyer-operating means whereby to close a tube and stop a conveyer when a bag has become sufficiently filled to operate the scale platform.

11. In a bag-filling machine the combination with a carrier, of scale means on the carrier; filling tubes above the scale means; bag-engaging means for each filling tube; means for rotating the carrier and moving all of said devices through a complete circuit; a clutch mechanism and means carried by the scale means and normally in position to operate the clutch mechanism before the scale means is actuated.

12. In a bag-filling machine the combination with a carrier, of a plurality of scale platforms carried by and moving with the carrier; a tubular support extending above the carrier; a plurality of conveyer trunks carried by and radiating from the tubular support; means in the trunks for feeding the material; filling tubes depending from the trunks; driving means extending through the tubular support for operating the feeding means in the trunks, and means operating between the scale platforms and the trunk feeding means to stop the latter.

13. In a bag-filling machine the combination with a carrier, of means for rotating the same; a tubular support on the carrier; a plurality of bag-filling mechanisms sustained by the support; a scale mechanism beneath each filling mechanism; means operated by the movement of the scale mechanism for stopping the filling mechanism when the bag is sufficiently filled and means coacting with the scale mechanism to stop the rotation of the carirer to permit a bag to be filled before it reaches the point of discharge.

14. In a bag-filling machine the combination with a carrier, of means for rotating the same; a plurality of bag-filling mechanisms moving with the carirer; a scale mechanism beneath each filling mechanism and means for discharging the filled bags at a given point in the revolution of the carrier.

15. In a bag-filling machine the combination with a carrier, of means for rotating the same; a clutch; a plurality of bag-filling mechanisms moving with the carrier; a scale mechanism also carried by the carrier and beneath each filling mechanism; means for feeding material to the several filling mechainsms; means operating between a feeding means and its scale mechanism to stop the feeding of material when a bag has been sufficiently filled and means carried by each scale mechanism for operating the clutch to stop the carrier to permit the bag to be sufficiently filled before discharging it.

16. In a bag-filling machine the combination with a carrier, of means for rotating the same; a tubular support on the carrier; a plurality of bag-filling mechanisms sustained by the support; a scale mechanism for each filling mechanism; a clutch coacting with the rotating means and having a movable member; a clutch lever operatively engaging the movable member, and means carried by each scale mechanism to operate the clutch lever to stop the rotation of the carrier.

17. In a bag-filling machine the combination with a carrier, of means for rotating the same; a plurality of bag-filling mechanisms; a clutch coacting with the rotating means and having a movable member; a clutch plate normally connected with respect to said movable clutch member and having means extending diagonally across the same whereby it may be operated, and a rod engaging the filling mechanism and having its lower end projecting below the carrier to engage the diagonal means on the clutch plate.

18. In a bag-filling machine the combination with a carrier, of means for rotating the same; a plurality of bag-filling mechanisms; a plurality of scale-beams,—one for each filling mechanism and disposed around the carrier; platforms above the scale beams; an ejector means for each scale platform and means adjacent the carrier for operating the ejector means.

19. In a bag-filling machine the combination with a carrier, of a tubular support therein; a plurality of filling mechanisms disposed about the upper end of the support; casings covering the filling mechanisms; means for feeding materials to the upper end of the casings; a scale mechanism beneath each filling mechanism and means operating between the scale mechanisms and the filling mechanisms whereby to stop the latter upon operation of the former.

In testimony whereof we affix our signatures in presence of two witnesses.

JOHN A. McANULTY.
JAMES REANEY, Jr.

Witnesses:
G. FERDINAND VOGT,
CHAS. B. MANN.